United States Patent [19]

Thorn et al.

[11] 4,437,648
[45] Mar. 20, 1984

[54] BELT TENSIONING TOOL

[75] Inventors: E. R. Thorn, Farmington Hills; Brent Thorn, Northville, both of Mich.

[73] Assignee: Van F. Belknap Co., Wixom, Mich.

[21] Appl. No.: 267,837

[22] Filed: May 28, 1981

[51] Int. Cl.$^3$ .............................................. B66F 3/24
[52] U.S. Cl. .............................. 254/93 R; 254/133 R; 254/228; 474/113
[58] Field of Search ................. 254/93 R, 133 R, 228, 254/100; 474/113; 29/239; 72/392

[56] References Cited

U.S. PATENT DOCUMENTS

| | | | |
|---|---|---|---|
| 1,832,606 | 11/1931 | Zimmerman | 254/133 R |
| 3,081,066 | 3/1963 | Murawski | 29/239 X |
| 3,325,095 | 6/1967 | Mueller et al. | 254/100 |
| 3,499,206 | 3/1970 | Quernheim | 29/239 |
| 3,662,994 | 5/1972 | Johns | 254/93 R |
| 3,679,176 | 7/1972 | Campbell | 254/100 |
| 3,762,688 | 10/1973 | Leonhardt | 254/93 R |
| 4,017,059 | 4/1977 | Laine | 254/100 X |

Primary Examiner—Frederick R. Schmidt
Assistant Examiner—Steven P. Schad
Attorney, Agent, or Firm—Cullen, Sloman, Cantor, Grauer, Scott & Rutherford

[57] ABSTRACT

A belt tensioning tool for tensioning an endless belt that passes around a plurality of spaced apart pulleys with one of the pulleys being mounted for adjustable movement relative to the other pulleys. The belt tensioning tool has as its basic components an actuator assembly including an extensible rod member, a reaction assembly mounted to one end of the actuator assembly, and a slidable assembly mounted to the extensible rod member. The reaction assembly includes a reaction arm member which extends in a cantilevered fashion away from the extensible rod end of the actuator assembly. Similarly, the slidable assembly includes a cantilevered, slidable arm member which is mounted to the extensible rod member and is slidably movable along a track in the reaction arm member. The reaction arm member and slidable arm member include opposed adapter members having pulley engaging ends that extend in opposite directions. Extension and retraction of the rod member results in relative movement between the adapter members on the slidable arm member and reaction arm member for the purpose of spreading a pair of pulleys apart thereby tensioning the endless belt around the pulleys.

1 Claim, 5 Drawing Figures

BELT TENSIONING TOOL

BACKGROUND OF THE INVENTION

The present invention relates to a belt tensioning tool for tensioning an endless belt that passes around a plurality of spaced apart pulleys with one of the pulleys being mounted for adjustable movement relative to the other pulleys.

It is conventional to provide a plurality of spaced apart pulleys that are drivingly interconnected by an endless belt. In an automotive engine, for example, a drive pulley assembly is commonly mounted outside the engine block and operatively connected to the crankshaft for driving one or more other components including the power steering pump, alternator, or air conditioning compressor. The driven components also include pulley assemblies that are interconnected with one another or with the drive pulley assembly at the crankshaft by one or more endless belts.

One of the driven components, such as the alternator, is typically mounted for adjustable movement so that its pulley assembly may be moved relative to the other pulley assemblies for the purpose of tensioning the endless belt drive between the pulley assemblies. The endless belt drive is initially positioned around the pulley assemblies during installation in a loose fashion. Then, the adjustably mounted pulley assembly is moved until the endless belt is tensioned to the desired amount.

A problem arises with tensioning the endless drive belt because there is little space within the confines of an engine compartment for using a tool such as a lever bar to spread the adjustably mounted pulley assembly away from the other pulley assemblies to tension the drive belt. Further, the prying action from a lever bar against some portion of the engine may damage one or more engine component. Thus, there has been a need for a belt tensioning tool that is constructed to be operable in the relatively small confines of an engine housing or the like. Further, there has been a need for a belt tensioning tool that is operable without contacting the engine or supports for the pulley assemblies.

SUMMARY OF THE INVENTION

The belt tensioning tool of the present invention is particularly useful for tensioning the endless belts that drivingly interconnect an engine crankshaft pulley assembly to pulley assemblies for other driven engine components including a power steering pump, alternator, or air conditioning compressor. The tool may, however, be used for tensioning any endless belt that passes around a plurality of spaced apart pulleys with at least one of the pulleys being mounted for adjustable movement relative to the other pulleys.

The tensioning tool has as its basic components an actuator assembly including an extensible rod member, a reaction assembly mounted to one end of the actuator assembly, and a slidable assembly mounted to the extensible rod member. The reaction assembly includes a reaction arm member which extends in a cantilevered fashion away from the extensible rod end of the actuator assembly. Similarly, the slidable assembly includes a cantilevered, slidable arm member which is mounted to the extensible rod member and is slidably movable along a track in the reaction arm member.

The reaction arm member and slidable arm member include opposed adapter members having pulley engaging ends that extend in opposite directions. The pulley engaging adapter members are aligned with one another along a line that is laterally offset from the longitudinal axes of their respective arm members. Extension and retraction of the rod member results in relative movement between the adapter members for the purpose of spreading a pair of pulleys apart thereby tensioning the endless belt around the pulleys.

As described, the belt tensioning tool of the present invention is used for tensioning an endless belt that passes around a plurality of spaced apart pulleys with at least one of the pulleys being mounted for adjustable movement relative to the other pulleys. In using the tool of the present invention, the operator loosens the mounting structure for the adjustably mounted pulley so that the endless belt may be loosely mounted around the pulley arrangement. Then, the belt tensioning tool is positioned such that the adapter members are located between the adjustably mounted pulley and another pulley. If the rod member is extended while the adapter members are in this position, the adapter members will move relative to one another and engage the grooved rims of the pulleys thereby spreading the pulleys and tensioning the endless belt to the desired amount.

A feature of the belt tensioning tool is that the adapter members are releasably mounted such that adapter members of various sizes and shapes may be used depending upon the sizes or locations of the pulleys. Another feature resides in the actuator assembly which is hand held and includes a self-contained gauge and valve arrangement for selectively actuating the rod member and monitoring the pressure exerted in tensioning the endless belt. Further, the reaction assembly includes an open hub that is mounted on the end of the actuator assembly and to which the cantilevered reaction arm member is mounted. When the extensible rod member is retracted, the mounting portion for the slidable arm member is housed within the hub thereby providing compactness and protection to the end of the extensible rod member.

Other advantages and meritorious features of the belt tensioning tool of the present invention will be more fully understood from the following description of the invention, the appended claims, and the drawings, a brief description of which follows.

DETAILED DESCRIPTION OF THE INVENTION

The belt tensioning tool made in accordance with the teachings of the present invention is illustrated in FIGS. 1–5.

The belt tensioning tool 10 of the present invention is particularly useful for tensioning the endless belts that drivingly interconnect an engine crankshaft pulley assembly to pulley assemblies for other driven engine components including a power steering pump, alternator, or air conditioning compressor. The tool may, however, be used for tensioning any endless belt that passes around a plurality of spaced apart pulleys with at least one of the pulleys being mounted for adjustable movement relative to the other pulleys.

Figure 2:
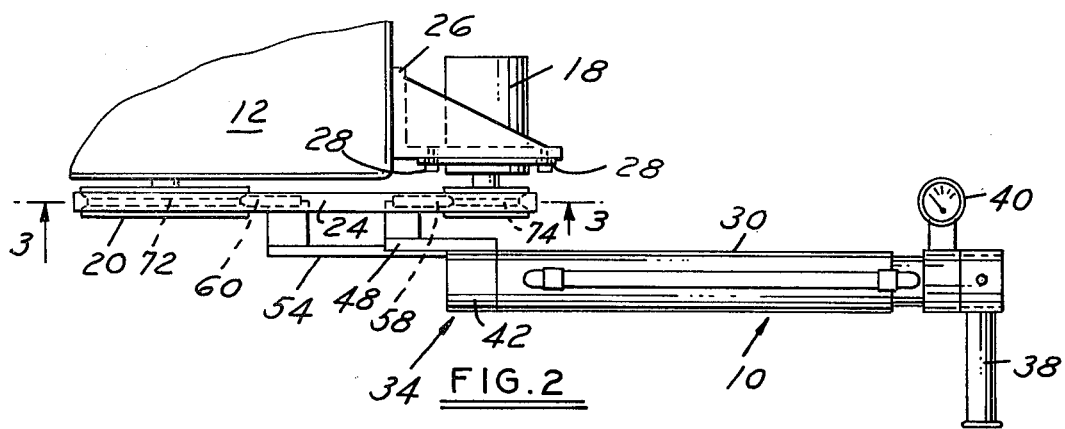
FIG. 2 is a top elevational view of the belt tensioning tool illustrated in FIG. 1.
Figure 3:
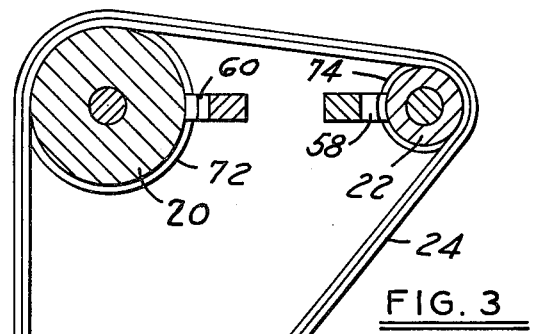
FIG. 3 is a cross-sectional view taken along line 3—3 in FIG. 2 illustrating the engagement between the adapter members and pulleys.
Figure 1:
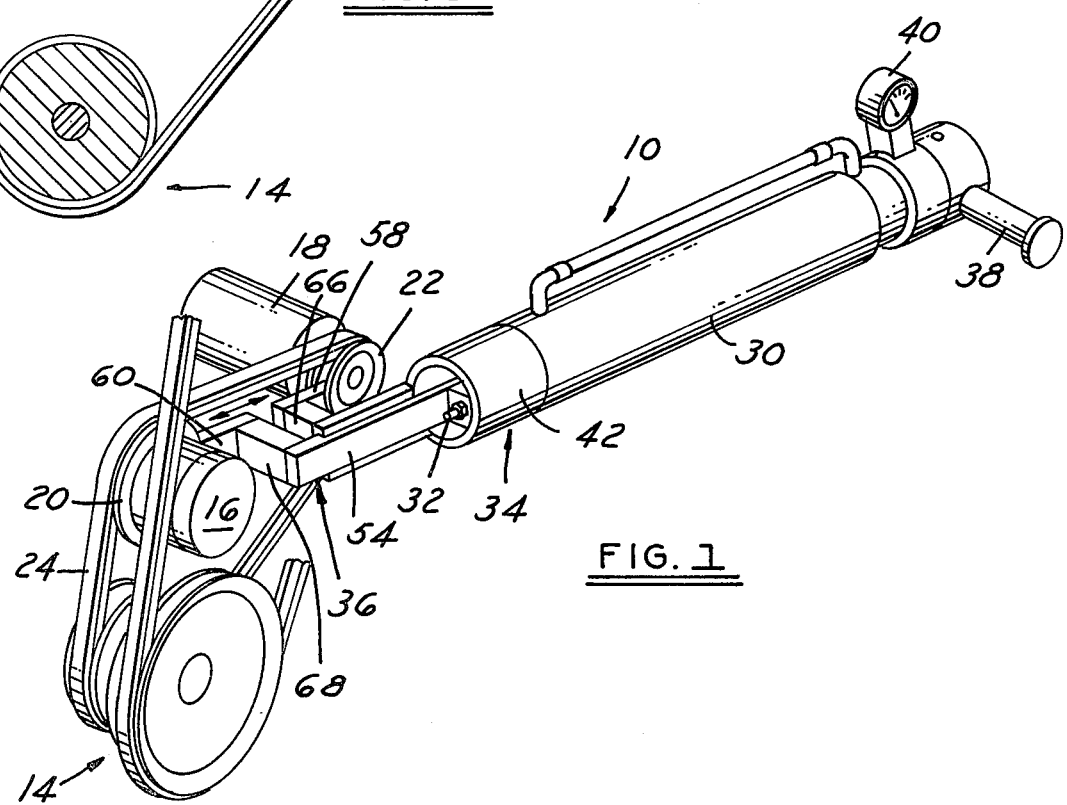
FIG. 1 is a perspective view of the belt tensioning tool in an operative position for tensioning an endless belt that passes around a plurality of spaced apart pulleys.
Figure 4:
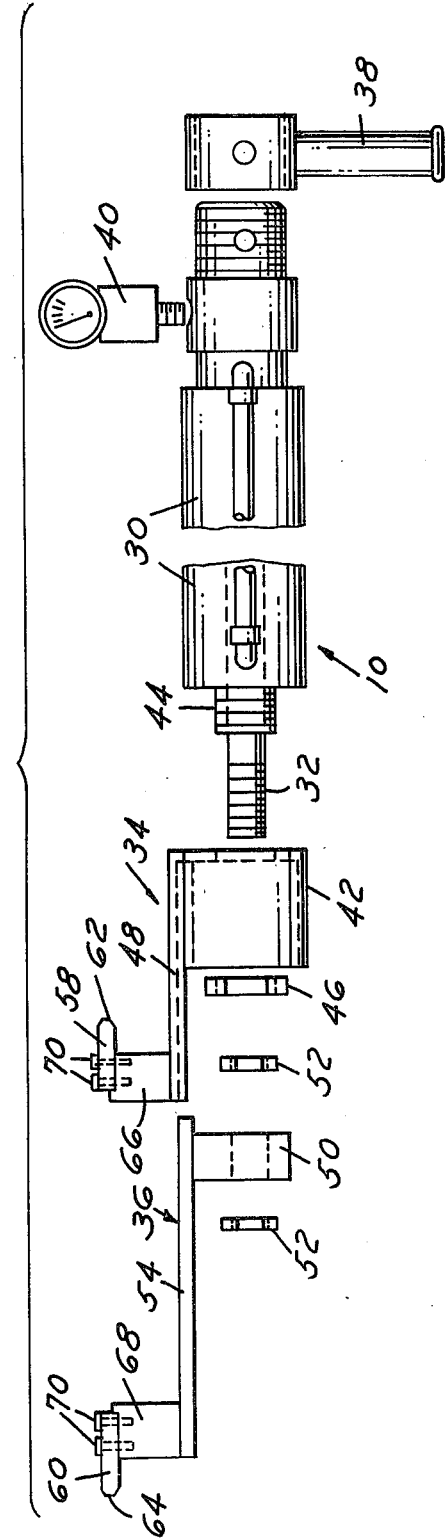
FIG. 4 is an assembly view illustrating the various components of the belt tensioning tool of the present invention.
Figure 5:
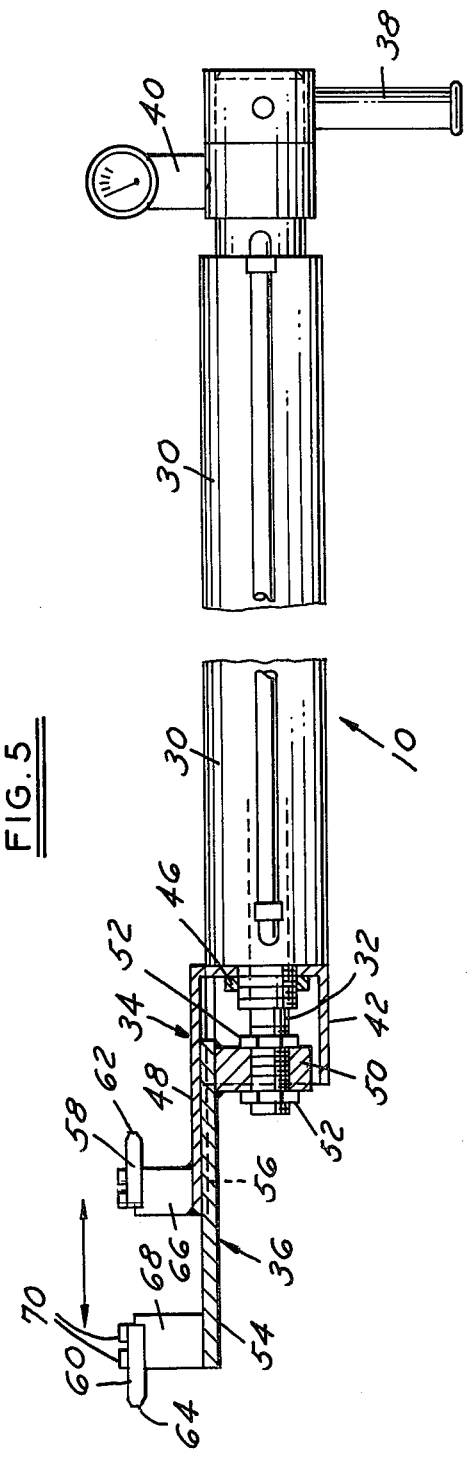
FIG. 5 is a side elevational view of the belt tensioning tool, partially in cross-section, for illustrating the coaction between the reaction and slidable assemblies.

In the automotive engine 12, illustrated in FIGS. 1 and 2, a drive pulley assembly 14 is mounted outside the engine block and operatively connected to the crankshaft for driving one or more other components including a power steering pump 16, alternator 18, or air conditioning compressor (not shown). The driven components 16, 18 also include pulley assemblies 20 and 22 that are interconnected by an endless belt 24 with the drive pulley assembly 14 at the crankshaft.

One of the driven components, such as the alternator 18, is conventionally mounted to engine 12 by bracket 26 and fasteners 28 for adjustable movement such that pulley assembly 22 may be moved relative to the other pulley assemblies 14, 20 for the purpose of tensioning the endless belt 24 between the pulley assemblies. Fasteners 28 are initially loosened so that alternator 18 is movable along slots (not shown) in bracket 26 thereby permitting endless belt 24 to be positioned around the pulley assemblies 14, 20, 22 in a loose fashion. Then, the adjustably mounted pulley assembly 22 is moved until endless belt 24 is tensioned to the desired amount and fasteners 28 are then re-tightened.

The belt tensioning tool 10 has as its basic components an actuator assembly 30 including an extensible rod member 32, a reaction assembly 34 mounted to one end of the actuator assembly 30, and a slidable assembly 36 mounted to the extensible rod member 32. The illustrated actuator assembly 30 comprises a double acting air cylinder which is hand held and includes at least one handle member 38. The actuator assembly 30 is self-contained and includes a conventional valve arrangement (not shown) for extending and retracting rod member 32. A gauge 40 is provided for monitoring the pressure exerted in tensioning the endless belt 24 so that a proper adjustment may be made.

The reaction assembly 34 includes an open hub member 42 that is secured to the stub end 44 of actuator 30 by mounting nut 46. A reaction arm member 48 is mounted to the outer periphery of hub member 42 and extends forwardly in a cantilevered fashion away from the rod end of the actuator assembly 30. Slidable assembly 36 includes a mounting block 50 which is adjustably mounted on the threaded end of rod member 32 by opposed mounting nuts 52. A slidable arm member 54 is mounted to the mounting block 50 and extends in a cantilevered fashion away from the rod end of actuator assembly 30. Arm member 54 is slidably movable along track 56 in reaction arm 48 in response to extension or retraction of rod member 32.

The reaction arm member 48 and slidable arm member 54 include opposed adapter members 58 and 60 having pulley engaging ends 62, 64 that extend in opposite directions. The pulley engaging adapter member 58, 60 are mounted to arm members 48 and 54 by spacers 66, 68 such that they are aligned with one another along a line that is laterally offset from the longitudinal axes of the arm member 48, 54. Extension and retraction of rod member 34 results in relative movement between adapter members 58 and 60 for the purpose of spreading a pair of pulleys apart thereby tensioning the endless belt around the pulleys.

A feature of the belt tensioning tool 10 is that the adapter member 58 and 60 are releasably mounted by fasteners 70 such that adapter members of various sizes and shapes may be used depending upon the sizes or locations of the pulleys.

Another feature of the belt tensioning tool 10 resides in the open hub member 42 that is mounted on the end of the actuator assembly 30. When the extensible rod member 32 is retracted, the slidable arm mounting block 50 and a portion of the slidable mounting arm 54 are housed within the hub thereby providing compactness and protection to the end of the extensible rod member 32.

As described, the belt tensioning tool 10 of the present invention is used for tensioning an endless belt such as 24 which passes around a plurality of spaced apart pulleys with at least one of the pulleys being mounted for adjustable movement relative to the other pulleys. In using the tool 10 of the present invention, the operator loosens the fasteners 28 for the adjustably mounted pulley 22 so that the endless belt 24 may be loosely mounted around the pulley arrangement. Then, the belt tensioning tool 10 is positioned such that the adapter members 58 and 60 are located between pulley 22 and another pulley such as pulley 20. If rod member 32 is extended while the adapter members 58, 60 are in the position illustrated in FIG. 1, adapter members 58, 60 will move relative to one another and engage the grooved rims 72 and 74 of pulleys 20, 22 thereby spreading the pulleys and tensioning endless belt 24 to the desired amount.

It will be apparent to those skilled in the art that the foregoing disclosure is exemplary in nature rather than limiting, the invention being limited only by the appended claims.

What is claimed is:

1. An endless belt tensioning tool for tensioning an endless belt that passes around a plurality of spaced apart pulley means with one of said pulley means being mounted for adjustable movement relative to the other pulley means, said belt tensioning tool comprising:

an actuator assembly including an extensible rod means;

a reaction assembly mounted to one end of said actuator assembly, said reaction asembly including a first adapter member which is engageable with one of said pulley means;

a slidable assembly mounted to said extensible rod means, said slidable assembly including a second adapter member which is engageable with another of said pulley means;

said first adapter member being releasably mounted on a reaction arm member and said second adapter member being releasably mounted on a slidable arm member, and said adapter members including pulley engaging ends which extend in opposite directions;

said reaction arm member and slidable arm member being parallel and said slidable arm member being slidably movable along a track in said reaction arm member;

said reaction assembly including an open generally cylindrical hub member mounted to said one end of said actuator assembly, said reaction arm member being mounted to the outer periphery of said hub member with the longtudinal axis of said reaction arm member being laterally offset from the longtudinal axis of said extensible rod means, said reaction arm member extending in a cantilevered fashion away from said hub member and said one end of said actuator asssembly, said slidable assembly including a mounting block mounted to said extensible rod means, said slidable arm member being mounted to the periphery of said mounting block with the longitudinal axis of said slidable arm member also being laterally offset from the longitudinal axis of said extensible rod means, said slidable arm member extending in a cantilevered fashion away from the mounting block and said one end of said actuator assembly and slidably engaging the track in said reaction arm member, and said mounting block being positioned within said open hub member when said rod means is fully retracted; and said second adapter member being movable relative to said first adapter member in response to extension of said rod means for thereby causing selective movement of said adjustably mounted pulley means and tensioning of said belt.

* * * * *